(12) United States Patent
Zhao et al.

(10) Patent No.: US 11,741,746 B2
(45) Date of Patent: Aug. 29, 2023

(54) ELECTRONIC DEVICE (71) Applicant: GUANGDONG OPPO MOBILE TELECOMMUNICATIONS CORP., LTD., Guangdong (CN)

(72) Inventors: Bin Zhao, Guangdong (CN); Ruitian Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 83 days.

(21) Appl. No.: 17/564,365

(22) Filed: Dec. 29, 2021

(65) Prior Publication Data
US 2022/0122376 A1 Apr. 21, 2022

Related U.S. Application Data (63) Continuation of application No. PCT/CN2020/096820, filed on Jun. 18, 2020.

(30) Foreign Application Priority Data

Jul. 9, 2019 (CN) .......................... 201921071690.4

(51) Int. Cl.
*G06T 11/00* (2006.01)
*G06V 40/16* (2022.01)
(Continued)

(52) U.S. Cl.
CPC .......... *G06V 40/161* (2022.01); *G06V 10/147* (2022.01); *H04M 1/02* (2013.01); *H04N 23/00* (2023.01)

(58) Field of Classification Search
CPC .... G06F 1/1626; G06F 1/1686; G06F 1/1643; G06F 3/0421; A61B 5/02433;
(Continued)

(56) References Cited

U.S. PATENT DOCUMENTS

2019/0170690 A1* 6/2019 Qiu .................... G01N 1/2226
2019/0345748 A1* 11/2019 Liao ........................ G06F 1/163

FOREIGN PATENT DOCUMENTS

CN 107343122 11/2017
CN 206674128 11/2017
(Continued)

OTHER PUBLICATIONS

WIPO, International Search Report for International Application No. PCT/CN2020/096820, dated Sep. 11, 2020.
(Continued)

*Primary Examiner* — Phuoc H Doan
(74) *Attorney, Agent, or Firm* — Hodgson Russ LLP (57) ABSTRACT Disclosed is an electronic device. The electronic device includes a first housing, a second housing, and an input-output assembly. The second housing is arranged on a side opposite to a display screen of the electronic device. The first housing and the second housing are connected to define a receiving space. The second housing defines a light through hole. The input/output assembly is arranged on the first housing and received in the receiving space. A side of the first housing facing the second housing is arranged with a limiting member, and the limiting member is configured to fix the input-output assembly on the first housing. The input-output assembly includes a plurality of input-output modules including a laser transmitter, a laser receiver, and at least one image collector. Each input-output module faces the light through hole.

20 Claims, 12 Drawing Sheets (51) Int. Cl.
*G06V 10/147* (2022.01)
*H04M 1/02* (2006.01)
*H04N 23/00* (2023.01)

(58) Field of Classification Search
CPC .. G06K 9/00013; G02B 6/0051; G06V 40/16; G06V 10/147; H04M 1/02; H04N 5/225
USPC ........................................................ 382/118
See application file for complete search history.

(56) References Cited

FOREIGN PATENT DOCUMENTS

| | | |
|---|---|---|
| CN | 207218775 | 4/2018 |
| CN | 108234850 | 6/2018 |
| CN | 108390970 A | 8/2018 |
| CN | 108418922 | 8/2018 |
| CN | 207691920 | 8/2018 |
| CN | 109040556 | 12/2018 |
| CN | 109451228 | 3/2019 |
| CN | 208572262 | 3/2019 |
| CN | 208724035 | 4/2019 |
| CN | 110049214 | 7/2019 |
| CN | 209823807 | 12/2019 |
| CN | 210075369 | 2/2020 |
| KR | 20180017375 | 2/2018 |

OTHER PUBLICATIONS

EPO, Extended European Search Report for EP Application No. 20836654.2, dated Jul. 18, 2022.

\* cited by examiner

ELECTRONIC DEVICE

CROSS REFERENCE

The present application is a continuation of International Patent Application No. PCT/CN2020/096820, filed on Jun. 18, 2020, which claims priority to Chinese Patent Application No. 201921071690.4, filed on Jul. 9, 2019, the entire disclosures of which are incorporated herein by reference.

TECHNICAL FIELD

The present disclosure relates to the field of electronic terminal technologies, and in particular to an electronic device.

BACKGROUND

A depth camera can obtain depth information of objects in a scene. When the depth camera is applied to an electronic device, such as a mobile phone, the electronic device can use the depth information obtained by the depth camera to implement three-dimensional face authentication, depth information assisted beauty, and other applications, which greatly enriches the functions of the electronic device. However, the conventional depth camera is usually used as a front camera of the mobile phone, which will make the electronic device less capable. For example, the depth camera as the front camera cannot fully obtain the depth information in the scene. When a user needs to use the electronic device to realize applications such as three-dimensional (3D) scene modeling, the function of 3D scene modeling cannot be realized.

SUMMARY OF THE DISCLOSURE

The present disclosure provides an electronic device.

The electronic device includes a first housing, a second housing, and an input-output assembly. The second housing is arranged on a side opposite to a display screen of the electronic device. The first housing and the second housing are connected to define a receiving space. The second housing defines a light through hole. The input/output assembly is arranged on the first housing and received in the receiving space. A side of the first housing facing the second housing is arranged with a limiting member, and the limiting member is configured to fix the input-output assembly on the first housing. The input-output assembly includes a plurality of input-output modules including a laser transmitter, a laser receiver, and at least one image collector. Each input-output module faces the light through hole.

DETAILED DESCRIPTION

The implementation of the present disclosure will be further described below in conjunction with the drawings. Same or similar reference numerals in the drawings indicate same or similar elements or elements with same or similar functions throughout.

In addition, the implementation manners of the present disclosure described below in conjunction with the drawings are exemplary and are only intended to explain the implementation manners of the present disclosure, and cannot be understood as a limitation of the present disclosure.

In the present disclosure, unless expressly stipulated and defined otherwise, the first feature being "on" or "under" the second feature may be the first and second features in direct contact or in indirect contact through an intermediary. Moreover, the first feature being "on", "above", and "over" the second feature may mean that the first feature is directly above or obliquely above the second feature, or simply means that the level of the first feature is higher than that of the second feature. The first feature being "under", "below", and "beneath" the second feature may mean that the first feature is directly below or obliquely below the second feature, or simply means that the level of the first feature is lower than that of the second feature.

Figure 1:
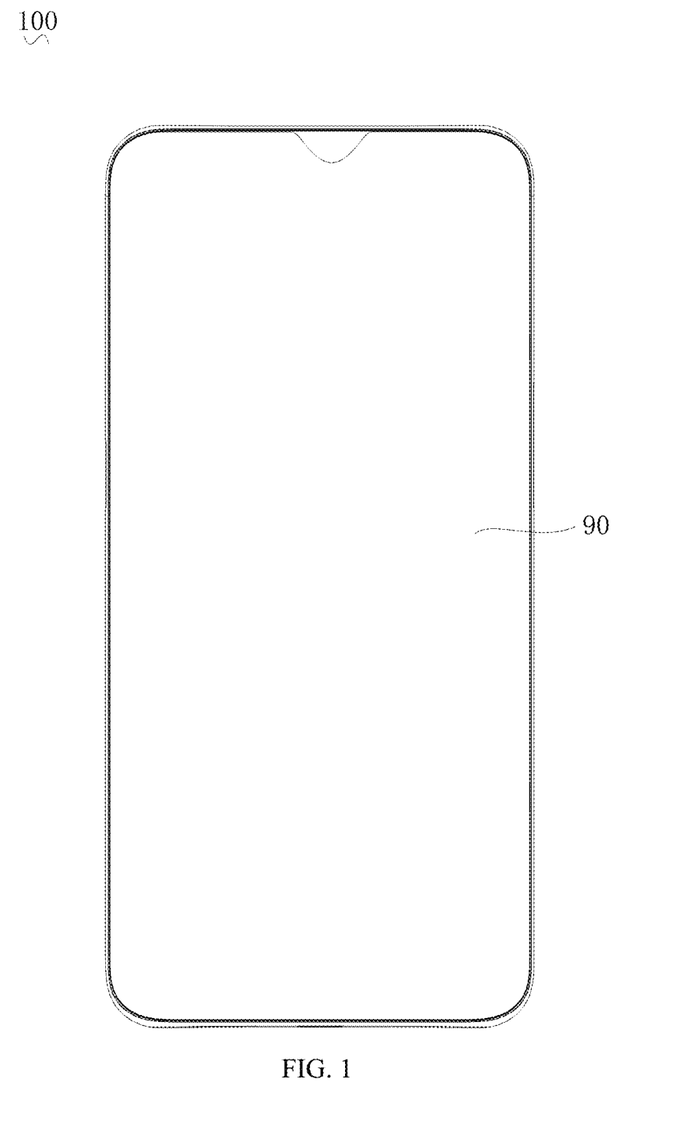
FIG. 1 is a front view of an electronic device according to an embodiment of the present disclosure.
Figure 2:
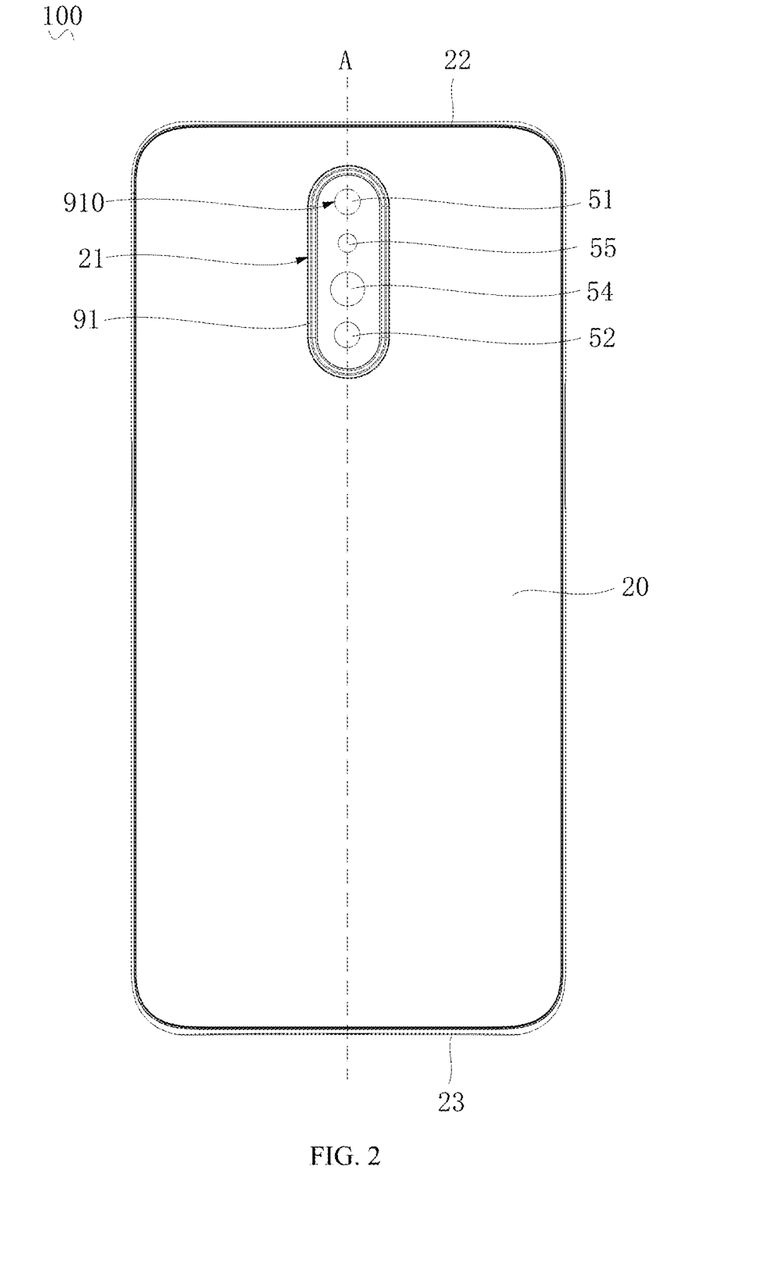
FIG. 2 is a rear view of the electronic device shown in FIG. 1.
Figure 3:
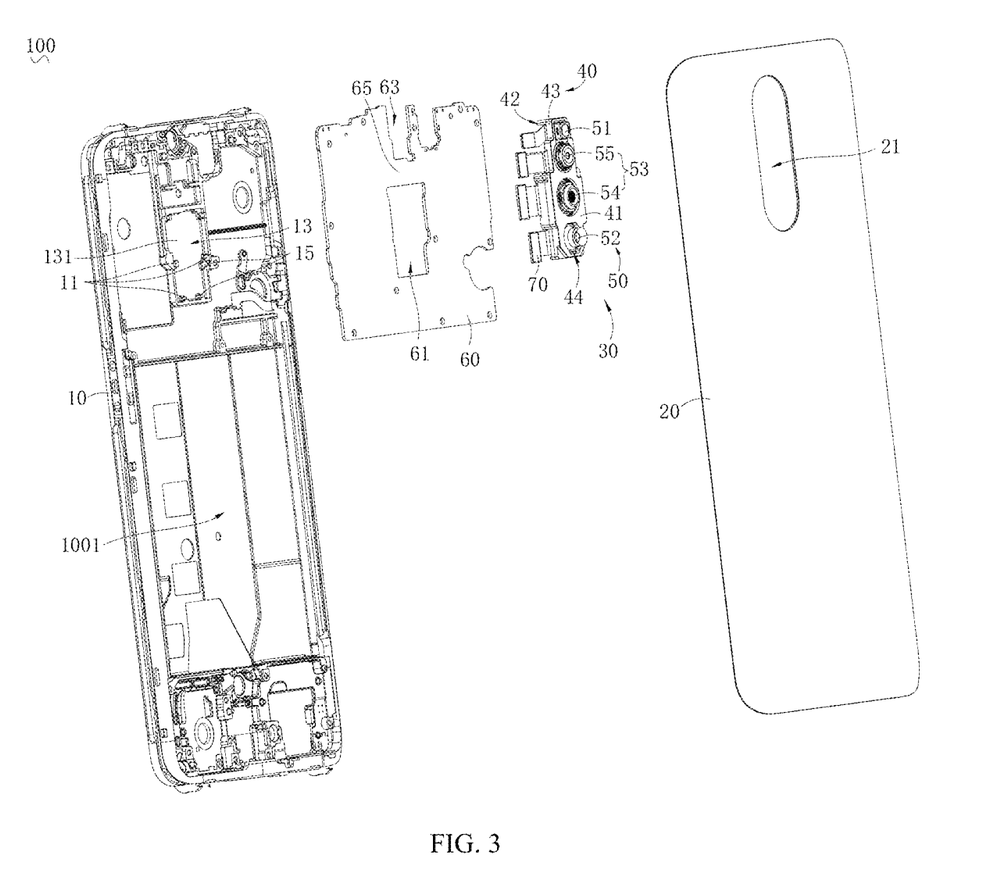
FIG. 3 is a partial exploded schematic view of the electronic device shown in FIG. 2.

Referring to FIGS. 1 to 3 together, the present disclosure provides an electronic device 100. The electronic device 100 includes a first housing 10, a second housing 20 and an input-output assembly 30. The second housing 20 is disposed on a side opposite to a display screen 90 of the electronic device 100. The first housing 10 and the second housing 20 are connected to define a receiving space 1001 between the first housing 10 and the second housing 20. The second housing 20 defines a light through hole 21. The input-output assembly 30 is arranged on the first housing 10 and is received in the receiving space 1001. A side of the first housing 10 facing the second housing 20 is arranged with a limiting member 11. The limiting member 11 is configured to fix the input-output assembly 30 on the first housing 10. The input-output assembly 30 includes multiple input-output modules 50. The multiple input-output modules 50 include at least a laser transmitter 51, a laser receiver 52, and at least one image collector 53. Each input-output module 50 faces the light through hole 21.

In the electronic device 100 of the embodiment of the present disclosure, a depth camera formed by the laser transmitter 51 and the laser receiver 52 is arranged on the first housing 10, such that the depth camera is configured as a rear camera of the electronic device 100, and depth information in a scene can be completely captured, thereby enriching the functions of the electronic device 100. Moreover, the electronic device 100 is further arranged with the at least one image collector 53. In this way, the depth information obtained by the depth camera and color information obtained by the at least one image collector 53 may be combined to realize more applications, such as three-dimensional scene modeling, thereby further enriching the functions of the electronic device 100.

Referring to FIGS. 1 to 3 together, the electronic device 100 of the present disclosure includes the first housing 10, the second housing 20, the input-output assembly 30, a main board 60 and the display screen 90. The second housing 20 is disposed on a side opposite to the display screen 90, the first housing 10 and the second housing 20 are connected to define the receiving space 1001, and the input-output assembly 30 and the main board 60 are received in the receiving space 1001. When a user normally uses the electronic device 100, he/she always looks at a surface at which the display screen 90 is located.

The first housing 10 includes a step 15 and the limiting member 11. The first housing 10 defines a receiving groove 13 on a side facing the second housing 20. The number of the steps 15 may be multiple, and the multiple steps 15 extend from a bottom wall 131 of the receiving groove 13. In an example, the limiting member 11 may be a limiting protrusion 11 extending from the first housing 10. The limiting protrusion 11 is arranged in the receiving groove 13. The number of the limiting protrusions 11 may be multiple, and at least one limiting protrusion 11 extends from a top surface of the step 15. A part of the at least one limiting protrusion 11 extends from the top surface of the step 15, and the other part extends from the bottom wall 131 of the receiving groove 13.

The second housing 20 defines a light through hole 21 facing the input-output module 50, such that the input-output module 50 can emit light to an outside and/or receive light incident from the outside. The second housing 20 includes a top 22, a bottom 23, and a central axis A perpendicular to the top 22 and the bottom 23.

The input-output assembly 30 is arranged on the first housing 10 and is received in the receiving space 1001. The limiting member 11 on the first housing 10 can fix the input-output assembly 30 on the first housing 10. The input-output assembly 30 includes the multiple input-output modules 50 and a bracket 40.

The multiple input-output modules 50 include at least the laser transmitter 51, the laser receiver 52 and the at least one image collector 53. The multiple input-output modules 50 face the light through hole 21, such that each input-output module 50 can emit light to the outside or receive light incident from the outside.

Specifically, the number of laser transmitters 51 may be one or more, and the number of laser receivers 52 may also be one or more. The number of the laser transmitters 51 is the same as the number of the laser receivers 52. When the number of the laser transmitter 51 and the number of the laser receiver 52 are each one, the laser transmitter 51 and the laser receiver 52 may form a structured light depth camera. In this case, light emitted from the laser transmitter 51 can form a speckle pattern. The laser receiver 52 collects the speckle pattern to obtain a speckle image, and the electronic device 100 may calculate the depth of the scene based on the speckle image. In other embodiments, the laser transmitter 51 and the laser receiver 52 may form a time-of-flight depth camera. In this case, the laser transmitter 51 emits uniform surface light outward, and the laser receiver 52 receives the light reflected by an object in the scene. The electronic device 100 may calculate the depth information of the scene based on a time difference between a time point when the laser transmitter 51 emits light and a time point when the laser receiver 52 receives the light. When the number of the laser transmitters 51 and the number of the laser receivers 52 are each multiple, for example, both are two, one laser transmitter 51 and one laser receiver 52 may form a structured light depth camera, and the other laser transmitter 51 and the other laser receiver 52 may form a time-of-flight depth camera. The electronic device 100 may measure depth information in different scenes through different depth cameras or measure depth information through the two sets of depth cameras at the same time.

The number of the image collectors 53 may be one or more. The type of an image collector 53 may be any one of an RGB camera, an infrared camera, or a black-and-white camera. When the number of the image collectors 53 is multiple, the types of image collectors 53 may be same or different. For example, two image collectors 53 are RGB cameras, or one image collector 53 is an RGB camera and the other image collector 53 is a black-and-white camera. Moreover, different image collectors 53 may have same or different field of view angles. For example, two image collectors 53 are both wide-angle cameras, or one image collector 53 is a wide-angle camera, and the other image collector 53 is a telephoto camera. Different image collectors 53 having different field of view angles can enable the electronic device 100 to have both digital zoom and optical zoom functions at the same time. When the electronic device 100 captures an image, the imaging effect of the image is better. In the embodiments of the present disclosure, the number of the image collectors 53 is two. One image collector 53 is a main camera 54 and the other image collector 53 is an auxiliary camera 55. The types of the main camera 54 and the auxiliary camera 55 are not limited here.

Center points of the multiple input-output modules 50 are located on a same straight line. The straight line is parallel to the central axis A of the second housing 20. In an example, when the number of the image collector 53 is one, and the main camera 54, the laser transmitter 51 and the laser receiver 52 form a structured light depth camera, the laser transmitter 51, the main camera 54, and the laser receiver 52 are arranged in sequence. The center points of the laser transmitter 51, the main camera 54, and the laser receiver 52 are located on the same straight line parallel to the central axis A (not shown). In this case, the main camera 54 is arranged between the laser transmitter 51 and the laser receiver 52, thereby improving the accuracy of the depth information measured by the structured light depth camera. In another example, when the number of the image collector 53 is one, and the main camera 54, the laser transmitter 51 and the laser receiver 52 form a time-of-flight depth camera, the laser transmitter 51, the laser receiver 52, the main camera 54 are arranged in sequence. The center points of the laser transmitter 51, the laser receiver 52, and the main camera 54 are located on the same straight line parallel to the central axis A (not shown). In this case, the laser receiver 52 is arranged between the laser transmitter 51 and the main camera 54. The position of the laser transmitter 51 and that of the laser receiver 52 are close, which can improve the accuracy of the depth information measured by the time-offlight depth camera. The laser receiver 52 and the main camera 54 are arranged together, which facilitates an alignment between the image collected by the main camera 54 and the depth image. In further another example, when the number of the image collectors 53 is two and each operates as the main camera 54 and the secondary camera 55 respectively, and when the laser transmitter 51 and the laser receiver 52 form a structured light depth camera, the laser transmitter 51, the secondary camera 55, the main camera 54, and the laser receiver 52 are arranged in sequence. The center points of the laser transmitter 51, the auxiliary camera 55, the main camera 54, and the laser receiver 52 are located on the same straight line parallel to the central axis A (shown in FIG. 3). In this case, the main camera 54 and the auxiliary camera 55 are arranged between the laser transmitter 51 and the laser receiver 52, thereby further increasing the distance between the laser transmitter 51 and the laser receiver 52 and improving the accuracy of the depth information measured by the structured light depth camera. The main camera 54 and the laser receiver 52 are arranged together, which facilitates the alignment between the image collected by the main camera 54 and the depth image. In further another example, the number of the image collectors 53 is two and each operates as the main camera 54 and the secondary camera 55 respectively, and when the laser transmitter 51 and the laser receiver 52 form a time-of-flight depth camera, the laser transmitter 51, the laser receiver 52, the main camera 54, and the auxiliary camera 55 are arranged in sequence, The central points of the laser transmitter 51, the laser receiver 52, the main camera 54, and the auxiliary camera 55 are located on the same straight line parallel to the central axis A (not shown). In this case, the laser transmitter 51 and the laser receiver 52 are arranged together, which can improve the accuracy of the depth information measured by the time-of-flight depth camera. The laser receiver 52 and the main camera 54 are arranged together, which facilitates the alignment between the image collected by the main camera 54 and the depth image.

Figure 4:
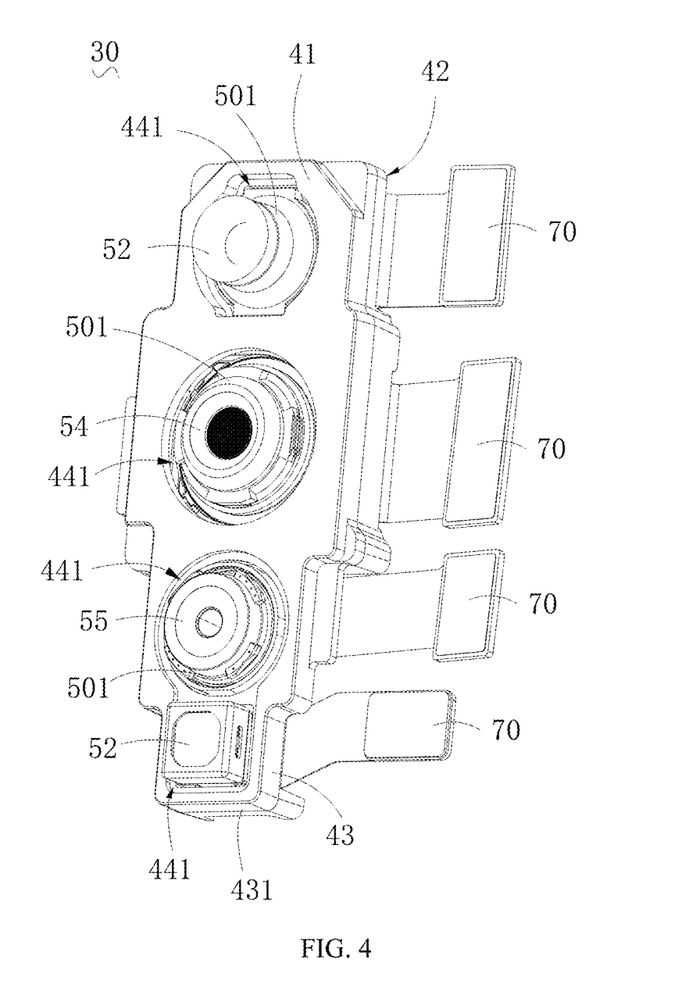
FIG. 4 is a structural perspective schematic view of an input-output assembly of the electronic device shown in FIG. 3.
Figure 5:
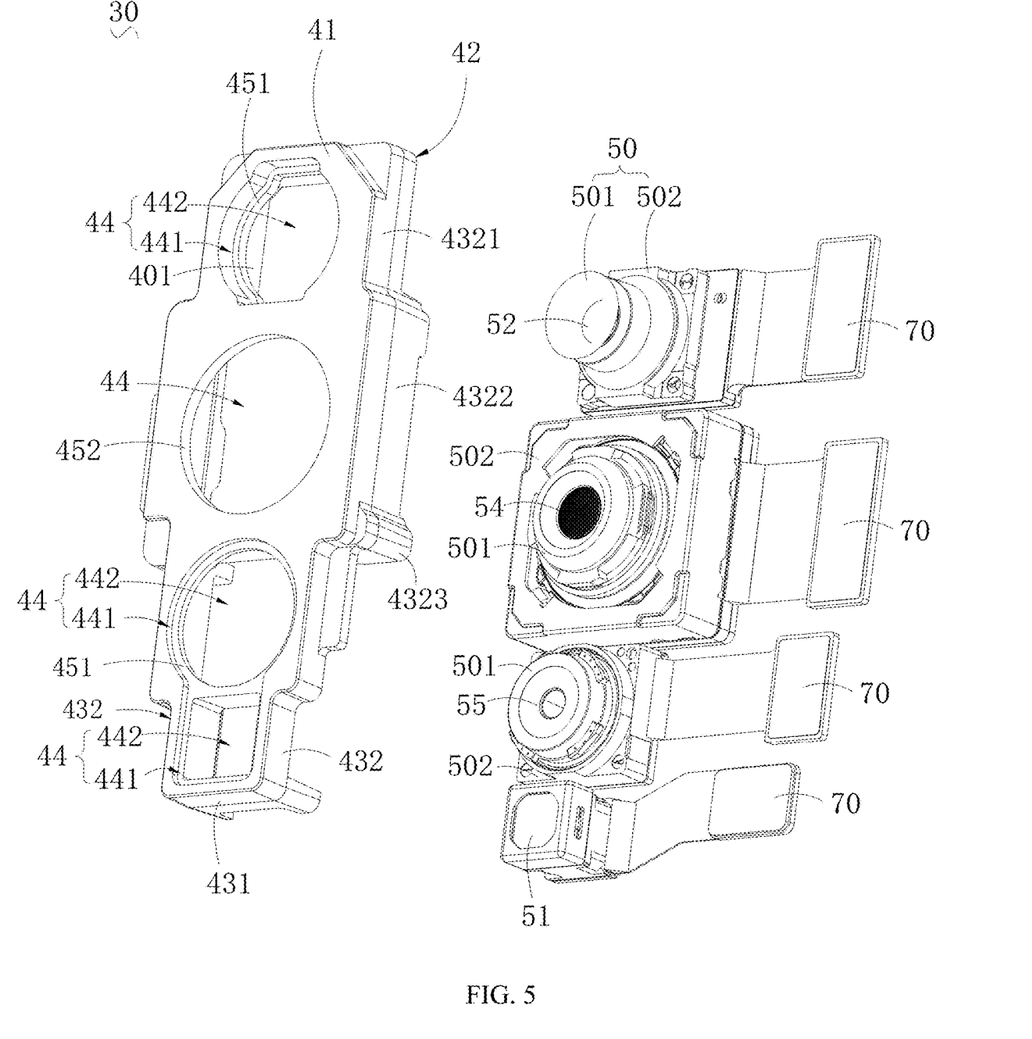
FIG. 5 is an exploded view of the input-output assembly of the electronic device shown in FIG. 4.

Referring to FIGS. 3 to 5 together, the bracket 40 includes a first surface 41, a second surface 42, and a third surface 43. The first surface 41 and the second surface 42 are arranged on two opposite sides of the bracket 40, and the third surface 43 is connected to the first surface 41 and the second surface 42. When the input-output assembly 30 is arranged on the first housing 10, the first surface 41 faces the second housing 20, the second surface 42 faces the first housing 10, and the limiting protrusion 11 contacts the third surface 43.

The bracket 40 defines multiple receiving cavities 44 penetrating from the first surface 41 to the second surface 42. The receiving cavities 44 are configured to arrange the multiple input-output modules 50 and expose the input-output modules 50 from the first surface 41. The number of the receiving cavities 44 may correspond to the number of input-output modules 50.

An inner wall 401 of at least one receiving cavity 44 located between a side with the first surface 41 and a side with the second surface 42 extends to a center of the corresponding receiving cavity 44 to form a first limiting wall 451. The first limiting wall 451 partitions the receiving cavity 44 into a first sub-cavity 441 and a second sub-cavity 442. The first sub-cavity 441 is located on the side at which the first surface 41 is located, and the second sub-cavity 442 is located on the side at which the second surface 42 is located. At least one input-output module 50 includes a first module part 501 and a second module part 502. A cross-sectional area of the second module part 502 is larger than a cross-sectional area of the first module part 501, the first module part 501 is partially received in the first sub-cavity 441, and the second module part 502 is received in the second sub-cavity 442. When the input-output module 50 is arranged in the receiving cavity 44, a connecting surface of the second module part 502 and the first module part 501 abuts against the first limiting wall 451. As shown in FIGS. 4 and 5, in an example, the receiving cavities 44 that receives the laser receiver 52 and the auxiliary camera 55 are each formed with the first limiting wall 451. The first module part 50 of the laser receiver 52 and the first module part 501 of the auxiliary camera 55 are respectively partially received in a corresponding first sub-cavity 441. The second module part 502 of the laser receiver 52 and the second module part 502 of the auxiliary camera 55 are respectively received in a corresponding second sub-cavity 442. The first limiting wall 451 can limit the position of the input-output module 50 and fix the input-output module 50 on the bracket 40, thereby preventing the input-output module 50 (laser receiver 52 and auxiliary camera 55) from falling off from the bracket 40.

An inner wall 401 of at least one receiving cavity 44 located on a side with the first surface 41 extends toward the center of the receiving cavity 44 to form a second limiting wall 452. At least one input-output module 50 includes a first module part 501 and a second module part 502. A cross-sectional area of the second module part 502 is larger than a cross-sectional area of the first module part 501. The second module part 502 is received in the receiving cavity 44, and the first module part 501 is disposed outside the receiving cavity 44. When the input-output module 50 is arranged in the receiving cavity 44, a connecting surface of the second module part 502 and the first module part 501 abuts against the second limiting wall 452. As shown in FIGS. 4 and 5, in an example, the receiving cavity 44 receiving the main camera 54 is formed with the second limiting wall 452, the second module part 502 of the main camera 54 is disposed in the receiving cavity 44, and the first module part 501 is disposed outside the receiving cavity 44. The second limiting wall 452 can limit the position of the input-output module 50 and fix the input-output module 50 on the bracket 40, thereby preventing the input-output module 50 (main camera 54) from falling off from the bracket 40.

At least one receiving cavity 44 includes a first sub-cavity 441 and a second sub-cavity 442. The first sub-cavity 441 is located on a side at which the first surface 41 is located, and the second sub-cavity 442 is located on a side at which the second surface 42 is located. A cross-sectional area of the second sub-cavity 442 is smaller than a cross-sectional area of the first sub-cavity 441. When at least one input-output module 50 is arranged in the receiving cavity 44, the shape of the second sub-cavity 442 corresponds to the shape of the input-output module 50, and the second sub-cavity 442 may fix the input-output module 50 to the bracket 40 to a certain extent. Therefore, the input-output module 50 is prevented from falling off the bracket 40. As shown in FIGS. 4 and 5, in an example, a receiving cavity 44 receiving the laser transmitter 51 is formed with the first sub-cavity 441 and the second sub-cavity 442, and the cross-sectional area of the second sub-cavity 442 is smaller than that of the first sub-cavity 441. When the laser transmitter 51 is received in the receiving cavity 44, since light emitted by the laser transmitter 51 has a certain emission angle, the cross-sectional area of the first sub-cavity 441 is set to be larger, which can prevent the first surface 41 of the bracket 40 from shielding the light emitted by the laser emitter 51.

Figure 6:
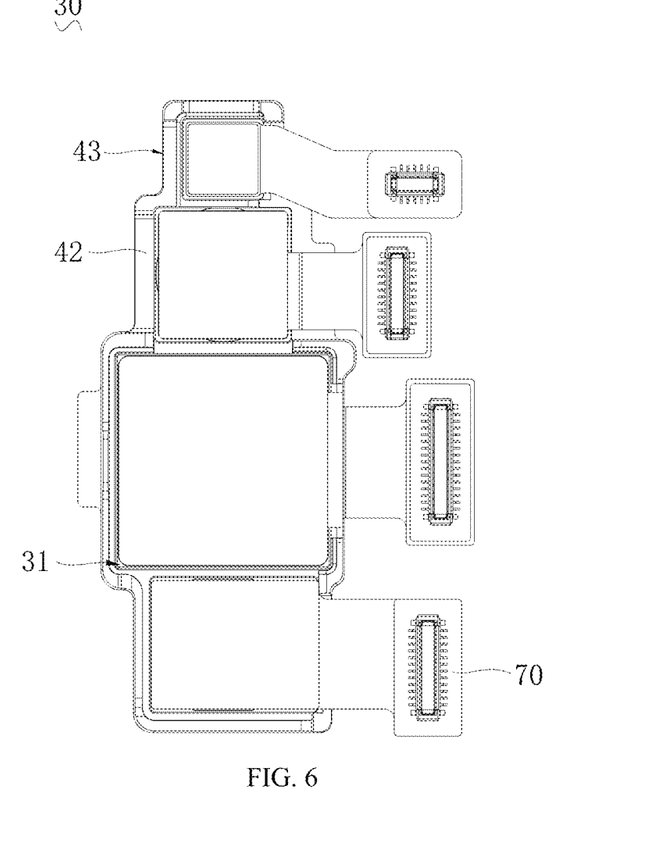
FIG. 6 is a rear view of the input-output assembly of the electronic device shown in FIG. 4.

Referring to FIGS. 4 and 6 together, when the input-output module 50 is received in the receiving cavity 44, a tiny gap 31 is defined between the inner wall 401 of the receiving cavity 44 on the side with the second surface 42 and the input-output module 50. A glue may be dispensed on the gap 31 to glue the inner wall 401 and the input-output module 50 to further fix the input-output module 50 on the bracket 40.

Figure 7:
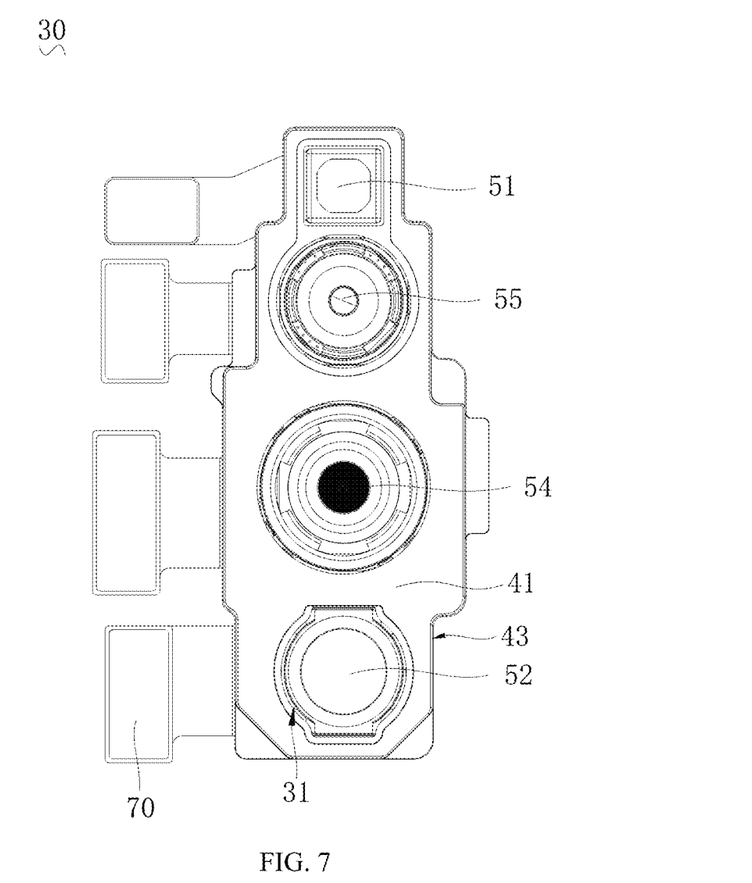
FIG. 7 is a front view of the input-output assembly of the electronic device shown in FIG. 4.

Referring to FIGS. 4, 5 and 7 together, when the input-output module 50 is received in the receiving cavity 44, in a case that the receiving cavity 44 is formed with the first limiting wall 451 or the second limiting wall 452, a tiny gap 31 is defined between the first limiting wall 451 or the second limiting wall 452 and the input-output module 50. A glue may be dispensed on the gap 31 to glue the inner wall 401 and the input-output module 50 to further fix the input-output module 50 on the bracket 40. In a case that the receiving cavity 44 is not formed with the first limiting wall 451 or the second limiting wall 452, but the receiving cavity 44 is formed with both the first sub-cavity 441 and the second sub-cavity 442, a tiny gap 31 is defined between the inner wall 401 of the second sub-cavity 442 and the input-output module 50. A glue may be dispensed on the gap 31 to glue the inner wall 401 and the input-output module 50 to further fix the input-output module 50 on the bracket 40.

Referring to FIGS. 3, 5, 8, 9 and 10, when the input-output assembly 30 is arranged on the first housing 10, the second surface 42 of the bracket 40 partially abuts against a top surface of the step 15, and the third surface 43 of the bracket 40 partially abuts against the limiting protrusion 11. The bracket 40 includes an axis B along a length direction, and the limiting protrusion 11 includes multiple sub-protrusions 111. The multiple sub-protrusions 111 are symmetrically arranged about the axis B.

Figure 8:
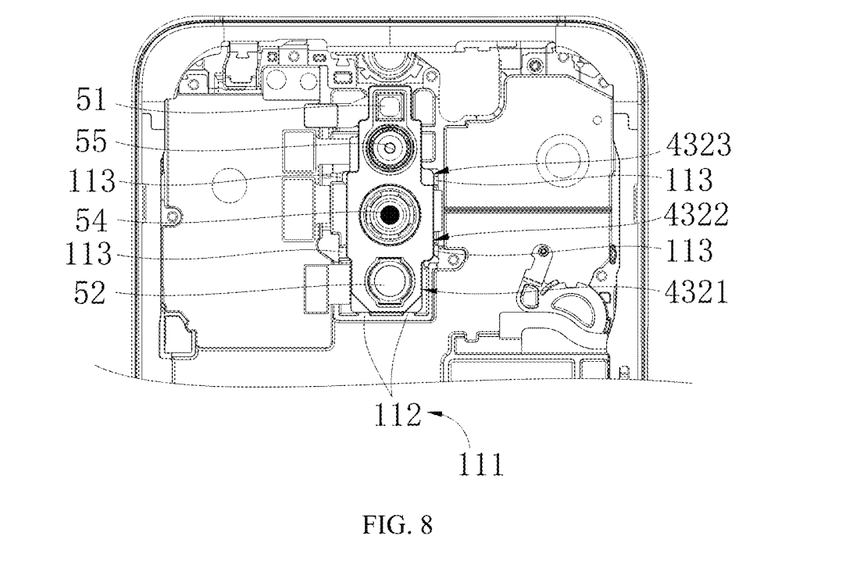
FIG. 8 is a structural schematic view of a partial plane of a combination of a first housing and an input-output assembly of the electronic device shown in FIG. 1.
Figure 9:
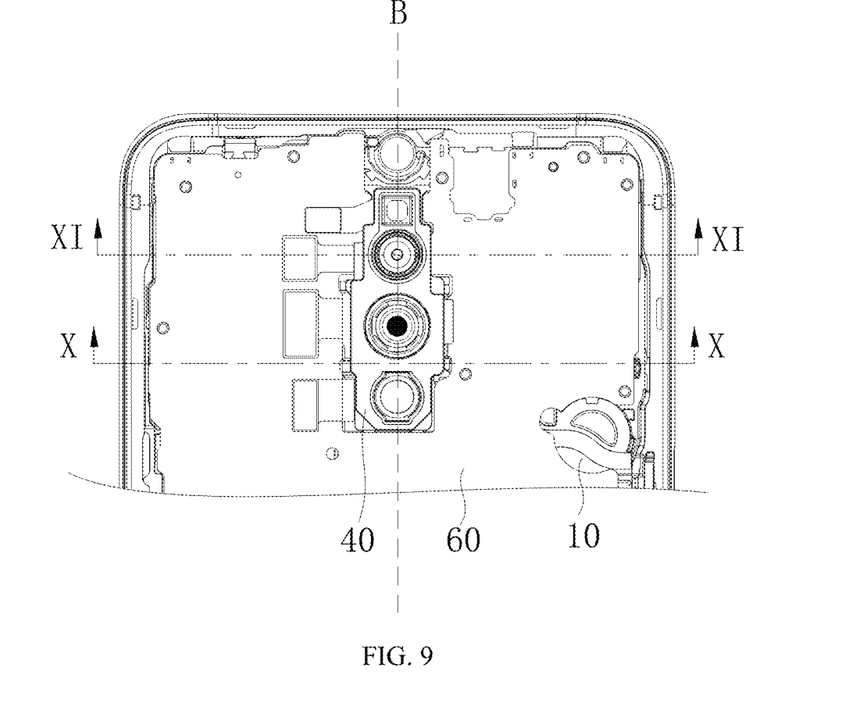
FIG. 9 is a structural schematic view of a partial plane of a combination of a first housing, a main board, and an input-output assembly of the electronic device shown in FIG. 1.
Figure 10:
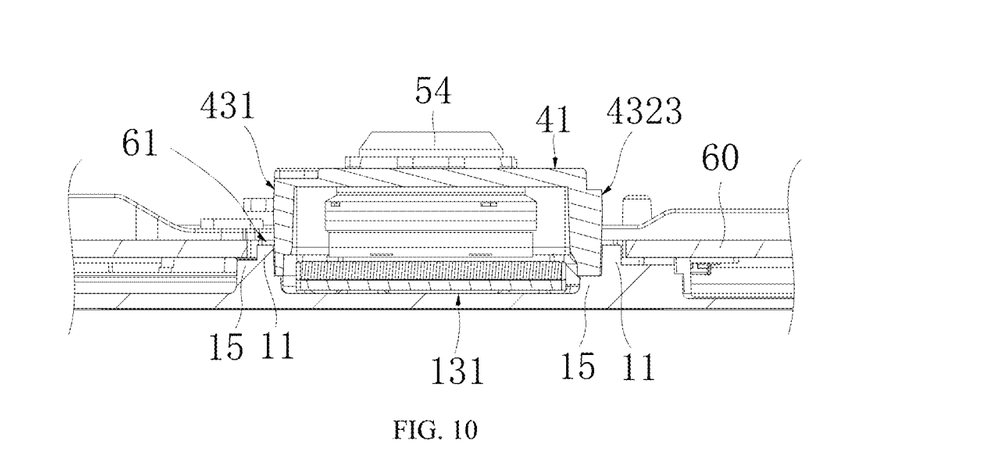
FIG. 10 is a schematic partial cross-sectional view of the electronic device shown in FIG. 9 along line X-X.

The third surface 43 includes a first sub-surface 431 perpendicular to the axis B and two second sub-surfaces 432 both connected to the first sub-surface 431. The two second sub-surfaces 432 are symmetrical about the axis B. The limiting protrusion 11 includes a first sub-protrusion 112 facing the first sub-surface 431 and multiple second sub-protrusions 113 facing the two second sub-surfaces 432 respectively. The first sub-surface 431 is engaged with the corresponding first sub-protrusion 112, and the second sub-surface 432 is engaged with the corresponding second sub-protrusion 113. Specifically, the two image collectors 53 are respectively the main camera 54 and the auxiliary camera 55, at least one of the multiple second sub-protrusions is arranged facing a side of the main camera 54, and other multiple second sub-protrusions are arranged facing the other side of the main camera 54. The first sub-protrusion 112 is arranged facing a side of the laser receiver 52. In some embodiments of the present disclosure, the main camera 54 has a larger photosensitive pixel array than the auxiliary camera 55, the main camera 54 has a larger volume, and the multiple second sub-protrusions 113 are arranged on both sides of the main camera 54. In this way, the input-output module 50 may be more firmly fixed to the second housing 20.

Each second sub-surface 432 includes a first part 4321, a second part 4322, and a third part 4323 that are sequentially connected. The first part 4321 corresponds to the laser receiver 52, and the second part 4322 and the third part 4323 correspond to the main camera 54. The second part 4322 is closer to a side wall of the receiving groove 13 than the first part 4321, and the third part 4323 is closer to the side wall of the receiving groove 13 than the second part 4322. The second part 4322 and the third part 4323 are engaged with a corresponding second sub-protrusion 113.

Figure 11:
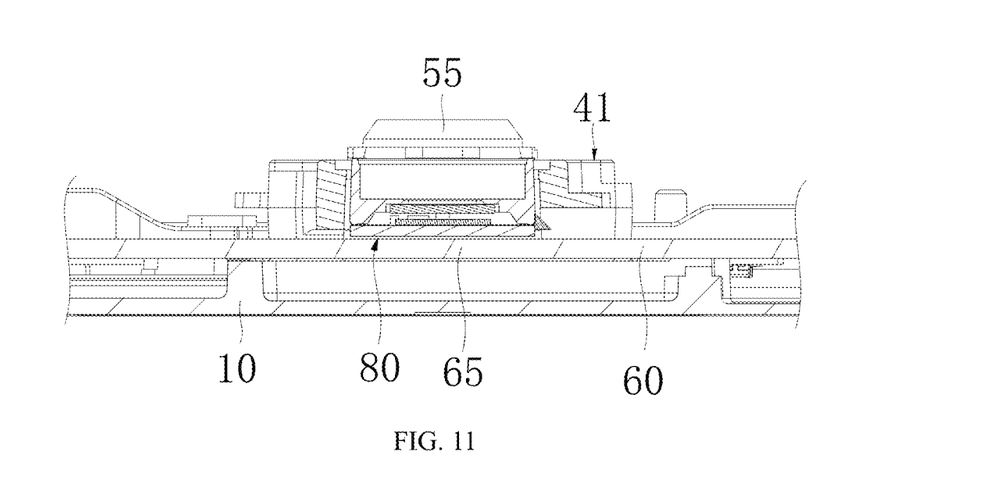
FIG. 11 is a schematic partial cross-sectional view of the electronic device shown in FIG. 9 along line XI-XI.
Figure 12:
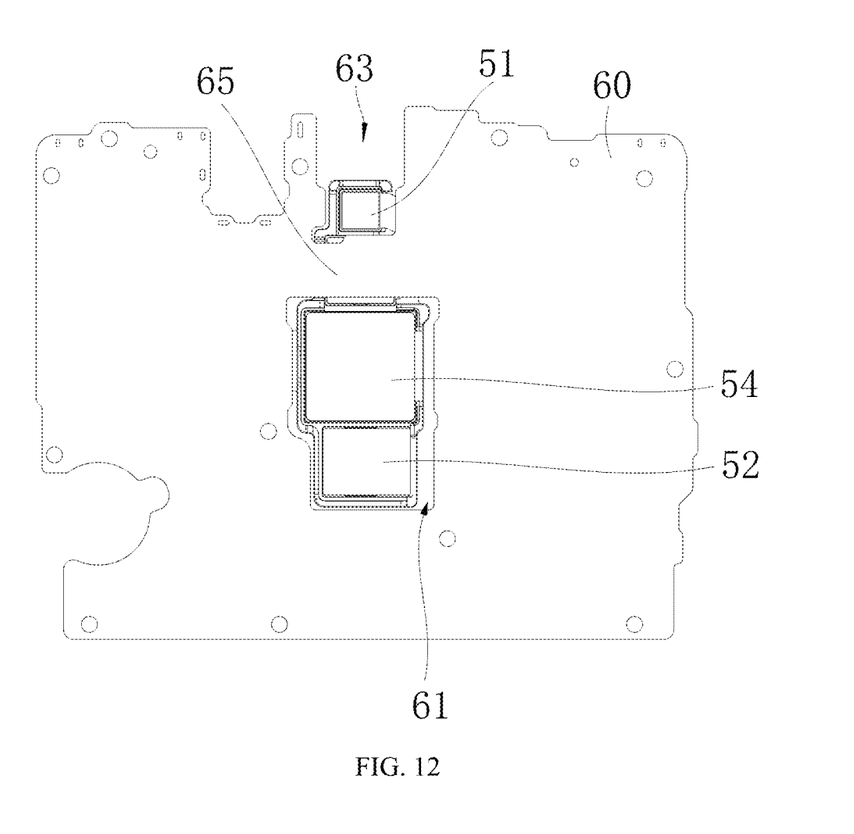
FIG. 12 is a rear view of a partial plane of a combination of a main board and an input-output assembly of the electronic device shown in FIG. 3.
Figure 13:
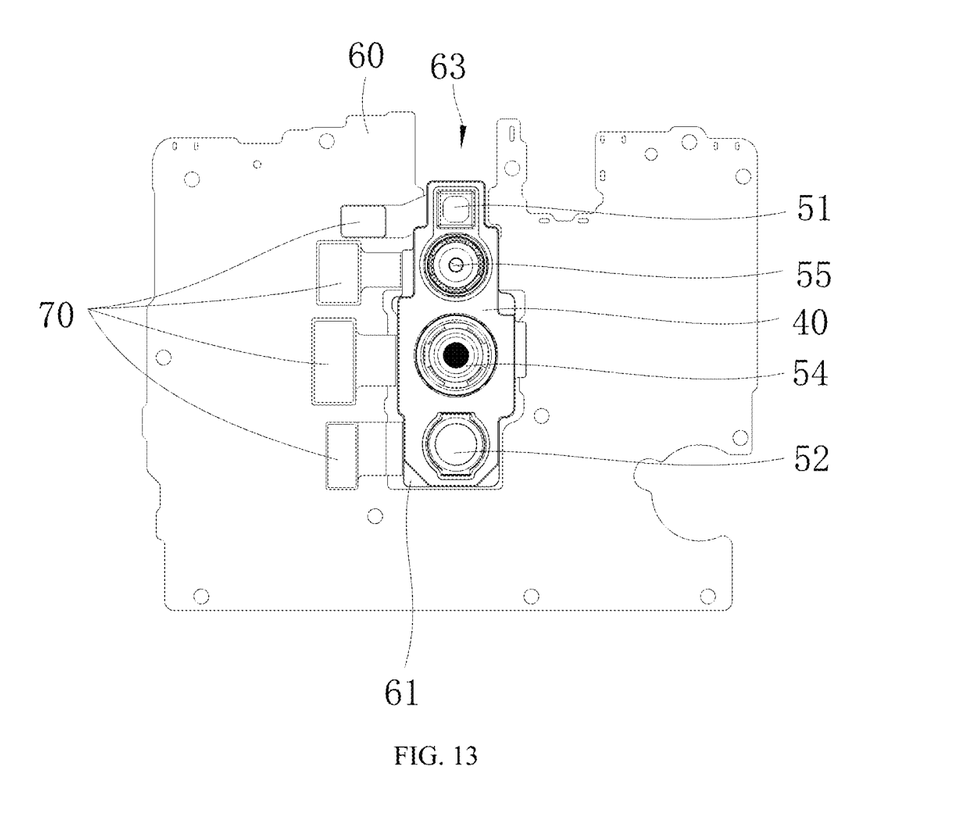
FIG. 13 is a front view of a partial plane of a combination of a main board and an input-output assembly of the electronic device shown in FIG. 3.

Referring to FIGS. 3 and 11 to 13 together, the main board 60 is disposed between the input-output assembly 30 and the first housing 10. The multiple input-output modules 50 are connected to the main board 60 through multiple connectors 70. Specifically, the multiple connectors 70 are connected to a side of the main board 60 facing the second housing 20. The main board 60 defines a first through hole 61 and a second through hole 63 facing the input-output assembly 30. The first through hole 61 and the second through hole 63 are separated by a reinforcing part 65 of the main board 60. When the input-output assembly 30 is arranged on the first housing 10, at least one input-output module 50 faces the first hole 61, and at least one input-output module 50 faces the second hole 63. The first through hole 61 and the second through hole 63 are connected by the reinforcing part 65, and at least one input-output module 50 faces the reinforcing part 65. The input-output module 50 facing the reinforcing part 65 may be carried on the reinforced part 65. In other embodiments, a gap 80 is defined between the input-output module 50 facing the input-output module 50 facing the reinforcing part 65 and the reinforcing part 65. As shown in FIG. 11, the auxiliary camera 55 faces the reinforcing part 65, and a gap 80 is defined between the auxiliary camera 55 and the reinforcing part 65. Of course, in other embodiments, another input-output module 50 may face the reinforcing part 65. The main board 60 defines the two through holes facing the input-output assembly 30, and the two through holes are connected by the reinforcing part 65, which can increase the strength of the main board 60 and ensure the stability of the main board 60 in use.

Referring to FIG. 10, the limiting protrusion 11 is disposed in the first through hole 61, such that the height of the limiting protrusion 11 is sufficient, the contact surface of the limiting protrusion 11 and the third surface 43 is larger, and the input-output assembly 30 is more stable when installed on the first housing 10.

In summary, in the electronic device 100 in the embodiments of the present disclosure, a depth camera formed by the laser transmitter 51 and the laser receiver 52 is arranged on the first housing 10, such that the depth camera can be used as a rear camera and can completely capture the depth information in the scene, thereby enriching the functions of the electronic device 100. Moreover, the electronic device 100 is arranged with the depth camera and the image collector 53 at the same time. The depth information obtained by the depth camera and the color information obtained by the image collector 53 can be combined to realize more applications, such as three-dimensional scene modeling, thereby further enriching the functions of the electronic device 100.

In addition, the multiple input-output modules 50 are arranged on the input-output assembly 30 to improve the integration of the input-output assembly 30. The multiple input-output modules 50 are arranged on the same bracket 40, such that the relative positions of the input-output modules 50 may be limited.

Figure 14:
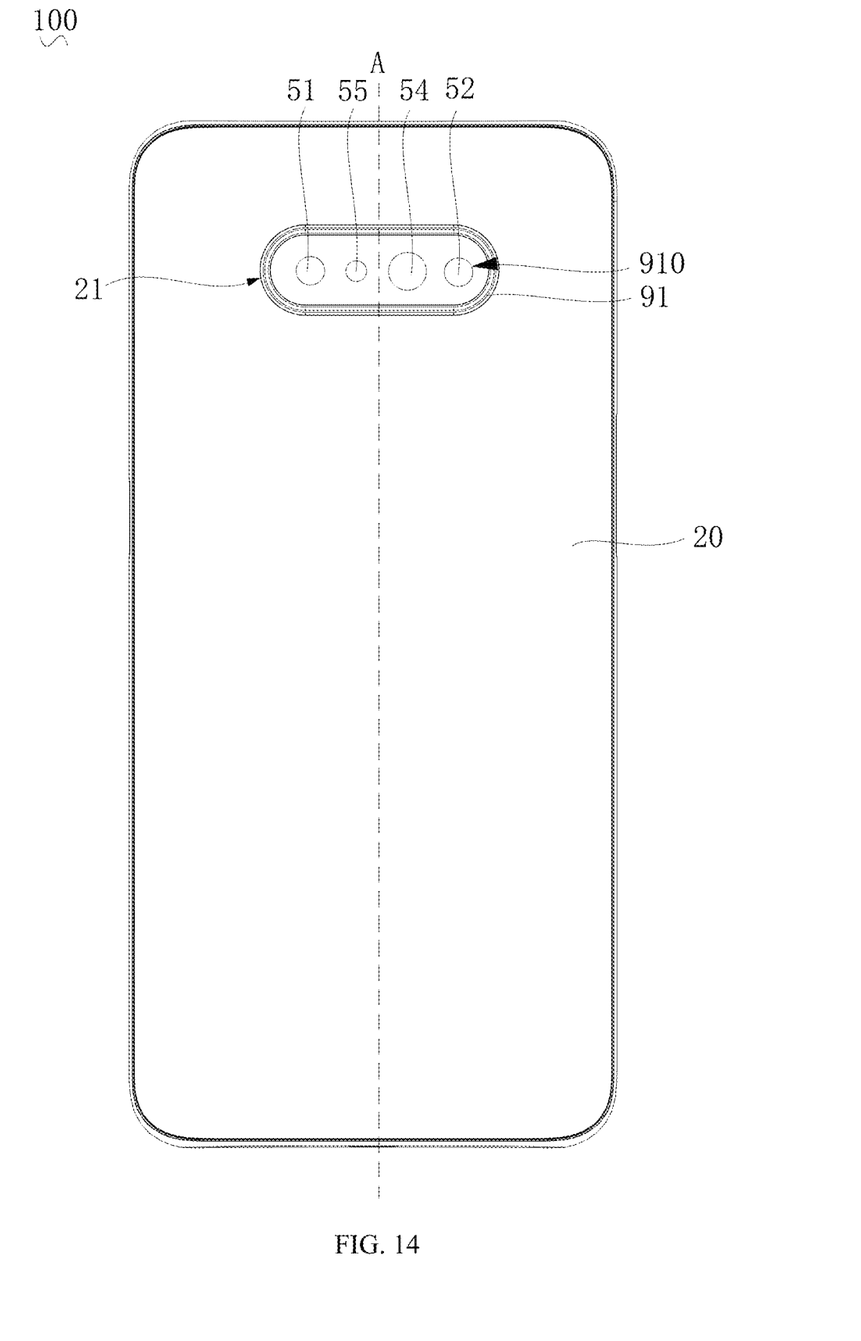
FIG. 14 is a rear view of an electronic device according to another embodiment of the present disclosure.

Referring to FIG. 14, in some embodiments, the center points of the multiple input-output modules 50 are located on the same straight line, and the straight line is perpendicular to the central axis A of the second housing 20. The arrangement of the multiple input-output modules 50 is similar to the arrangement where the center points of the multiple input-output modules 50 are parallel to the central axis A of the second housing 20, which will not be repeated here.

In some embodiments, the input-output module 50 may further include elements such as a floodlight and a flashlight. The floodlight, flashlight and other components may be arranged on the same bracket 40 as the laser transmitter 51, the laser receiver 52, and the image collector 53 to further improve the integration of the input-output assembly 30. The light through hole 21 also faces the newly-added elements such as the floodlight, flashlight, etc., such that light from elements such as the floodlight and flashlight can be emitted through the light through hole 21.

Referring to FIGS. 2 and 14 together, in some embodiments, the electronic device 100 may further include a decorative ring 91 disposed on the second housing 20. The decorative ring 91 is arranged in the light through hole 21, and the decorative ring 91 defines a though hole 910. The shape and size of the though hole 910 correspond to the shape and size of a corresponding input-output module 50, such that external light can enter the input-output module 50 after passing through the though hole 910 and the light through hole 21, or light emitted by the input-output module 50 can enter the outside after passing through the light through hole 21 and the though hole 910.

In the description of this specification, reference is made to the terms "certain embodiments", "one embodiment", "some embodiments", "exemplary embodiments", "examples", "specific examples", or "some examples". The description means that a specific feature, structure, material, or characteristic described in conjunction with the embodiment or example is included in at least one embodiment or example of the present disclosure. In this specification, the schematic representation of the above-mentioned terms does not necessarily refer to the same embodiment or example. Moreover, the described specific features, structures, material, or characteristics can be combined in an appropriate manner in any one or more embodiments or examples.

In addition, the terms "first" and "second" are only intended for descriptive purposes, and cannot be understood as indicating or implying relative importance or implicitly indicating the number of indicated technical features. Therefore, the features defined with "first" and "second" may explicitly or implicitly include at least one of the features. In the description of the present disclosure, "plurality" means at least two, for example two, three, unless otherwise specifically defined.

Although the embodiments of the present disclosure have been shown and described above, it can be understood that the above-mentioned embodiments are exemplary and should not be construed as limiting the present disclosure. Those skilled in the art can make changes, modifications, substitutions and modifications on the foregoing within the scope of the present disclosure, and the scope of the present disclosure is defined by the claims and their equivalents.

What is claimed is:

1. An electronic device, comprising:
a first housing;
a second housing, arranged on a side opposite to a display screen of the electronic device; wherein the first housing and the second housing are connected to define a receiving space; the second housing defines a light through hole; and
an input-output assembly, arranged on the first housing and received in the receiving space; wherein a side of the first housing facing the second housing is arranged with a limiting member, and the limiting member is configured to fix the input-output assembly on the first housing; the input-output assembly comprises a plurality of input-output modules;
wherein the plurality of input-output modules comprise a laser transmitter, a laser receiver, and at least one image collector, each input-output module facing the light through hole.

2. The electronic device according to claim 1, wherein the limiting member comprises a limiting protrusion extending from the first housing.

3. The electronic device according to claim 2, wherein the input-output assembly further comprises a bracket, and plurality of input-output modules are arranged on the bracket; the bracket comprises a first surface, a second surface, and a third surface; the first surface and the second surface are arranged on two opposite sides of the bracket, and the third surface is connected to the first surface and the second surface; the limiting member contacts the third surface, and the first surface faces the second housing.

4. The electronic device according to claim 3, wherein the bracket comprises an axis along a length direction, and the limiting protrusion comprises a plurality of sub-protrusions; the plurality of sub-protrusions are symmetrically arranged about the axis.

5. The electronic device according to claim 4, wherein the third surface comprises a first sub-surface perpendicular to the axis and two second sub-surfaces both connected to the first sub-surface; the two second sub-surfaces are symmetrical about the axis;
the plurality of sub-protrusions comprise a first sub-protrusion and a plurality of second sub-protrusions; wherein the first sub-protrusion faces the first sub-surface, at least one of the plurality of second sub-protrusions faces one of the two second sub-surfaces, and a remainder of the plurality of second sub-protrusions faces another of the two second sub-surfaces; the first sub-protrusion is engaged with the first sub-surface, and each second sub-protrusion is engaged with a corresponding second sub-surface.

6. The electronic device according to claim 4, wherein the first housing defines a receiving groove on a side facing the second housing; the limiting protrusion is arranged in the receiving groove, and the plurality of input-output modules are partially received in the receiving groove;
the first housing comprises a plurality of steps extending from a bottom wall of the receiving groove; when the plurality of input-output modules are received in the receiving groove, the second surface of the bracket partially abuts against the plurality of steps.

7. The electronic device according to claim 6, wherein at least one of the plurality of sub-protrusions extends from a top surface of a corresponding step; a part of another at least one of the plurality of sub-protrusions extends from a top surface of a corresponding step, and another part of the another at least one of the plurality of sub-protrusions extends from a bottom wall of the receiving groove;
the third surface of the bracket partially abuts against the plurality of sub-protrusions.

8. The electronic device according to claim 3, wherein the bracket defines a plurality of receiving cavities penetrating from the first surface to the second surface; each of the plurality of receiving cavities is configured to arrange a corresponding input-output module and expose the corresponding input-output module from the first surface.

9. The electronic device according to claim 8, wherein, for at least one of the plurality of receiving cavities, a receiving cavity comprises an inner wall located between a side with the first surface and a side with the second surface, and the inner wall extends to a center of the receiving cavity to form a first limiting wall; the first limiting wall partitions the receiving cavity into a first sub-cavity and a second sub-cavity; the first sub-cavity is located on the side with the first surface, and the second sub-cavity is located on the side with the second surface;

for at least one of the plurality of input-output modules, an input-output module comprises a first module part and a second module part; a cross-sectional area of the second module part is larger than a cross-sectional area of the first module part; the first module part is partially received in the first sub-cavity, and the second module part is received in the second sub-cavity; a connecting surface of the second module part and the first module part abuts against the first limiting wall.

10. The electronic device according to claim 8, wherein for at least one of the plurality of receiving cavities, a receiving cavity comprises an inner wall located on a side with the first surface, and the inner wall extends to a center of the receiving cavity to form a second limiting wall;

for at least one of the plurality of input-output modules, an input-output module comprises a first module part and a second module part; a cross-sectional area of the second module part is larger than a cross-sectional area of the first module part; the second module part is received in the receiving cavity, and the first module part is disposed outside the receiving cavity; a connecting surface of the second module part and the first module part abuts against the second limiting wall.

11. The electronic device according to claim 8, wherein for at least one of the plurality of receiving cavities, a receiving cavity comprises a first sub-cavity and a second sub-cavity; the first sub-cavity is located on a side with the first surface, and the second sub-cavity is located on a side with the second surface; a cross-sectional area of the second sub-cavity is smaller than a cross-sectional area of the first sub-cavity;

a shape of the second sub-cavity matches a shape of a corresponding input-output module.

12. The electronic device according to claim 11, wherein the corresponding input-output module is the laser transmitter.

13. The electronic device according to claim 8, wherein for one of the plurality of receiving cavities, a receiving cavity comprises an inner wall located on the second surface, and a gap is defined between the inner wall and a corresponding input-output module arranged in the receiving cavity.

14. The electronic device according to claim 1, wherein the second housing comprises a top, a bottom, and a central axis perpendicular to the top and the bottom; center points of the plurality of input-output modules are located on a same straight line, and the straight line is parallel to the central axis; or the second housing comprises a top, a bottom, and a central axis perpendicular to the top and the bottom; center points of the plurality of input-output modules are located on a same straight line, and the straight line is perpendicular to the central axis.

15. The electronic device according to claim 14, wherein a number of the at least one image collector is one; the laser transmitter, the image collector, and the laser receiver are arranged in sequence; or the number of the at least one image collector is one; the laser transmitter, the laser receiver, and the image collector are arranged in sequence.

16. The electronic device according to claim 14, wherein a number of the at least one image collector is two; the laser transmitter, the two image collectors, and the laser receiver are arranged in sequence; or the number of the at least one image collector is two; the laser transmitter, the laser receiver, and the two image collectors are arranged in sequence.

17. The electronic device according to claim 1, further comprising a main board; wherein the main board is arranged between the input-output assembly and the first housing; the plurality of input-output modules are connected to the main board through a plurality of connectors; the plurality of connectors are connected to a side of the main board facing the second housing.

18. The electronic device according to claim 17, wherein the main board defines a first through hole and a second through hole facing the input-output assembly; the first through hole and the second through hole are separated by a reinforcing part of the main board; at least one of the plurality of input-output modules faces the first hole, and at least one of the plurality of input-output modules faces the second hole;

the first through hole and the second through hole are connected by the reinforcing part, and at least one of the plurality of input-output modules faces the reinforcing part.

19. The electronic device according to claim 18, the input-output module facing the reinforcing part is carried on the reinforcing part; or a gap is defined between the input-output module facing the reinforcing part and the reinforcing part.

20. The electronic device according to claim 1, wherein the laser transmitter comprises a plurality of laser transmitters, and the laser receiver comprises a plurality of laser receivers; a number of the plurality of laser transmitters is equivalent to a number of the plurality of laser receivers.

* * * * *